United States Patent
Young

(10) Patent No.: US 7,350,729 B2
(45) Date of Patent: Apr. 1, 2008

(54) ROTOR ASSEMBLY FOR FISHING REELS

(76) Inventor: John N. Young, 35 Berry Trail, Fairfax, CA (US) 94930

( * ) Notice: Subject to any disclaimer, the term of this patent is extended or adjusted under 35 U.S.C. 154(b) by 344 days.

(21) Appl. No.: 11/061,960

(22) Filed: Feb. 17, 2005

(65) Prior Publication Data

US 2006/0180690 A1    Aug. 17, 2006

(51) Int. Cl.
*A01K 89/01*    (2006.01)
(52) U.S. Cl. ..................................... 242/310
(58) Field of Classification Search ......... 242/238–240
See application file for complete search history.

(56) References Cited

U.S. PATENT DOCUMENTS

| | | | | |
|---|---|---|---|---|
| 2,903,201 A | * | 9/1959 | Sarah | 242/236 |
| 3,061,231 A | * | 10/1962 | Gayle | 242/239 |
| 3,116,893 A | * | 1/1964 | Wood | 242/258 |
| 3,123,318 A | * | 3/1964 | Wood | 242/239 |
| 3,198,456 A | * | 8/1965 | Wood | 242/239 |
| 3,329,372 A | * | 7/1967 | Willis et al. | 242/239 |
| RE27,205 E | * | 10/1971 | Willis et al. | 242/319 |
| 3,858,822 A | * | 1/1975 | Wood | 242/239 |
| 4,154,413 A | * | 5/1979 | Hull | 242/311 |
| 4,386,743 A | * | 6/1983 | Moss | 242/240 |
| 5,213,279 A | * | 5/1993 | Puryear | 242/239 |
| 5,377,924 A | * | 1/1995 | Takeuchi | 242/238 |
| 5,388,776 A | * | 2/1995 | Childre | 242/239 |
| 6,889,826 B2 | * | 5/2005 | Harada et al. | 206/219 |

* cited by examiner

*Primary Examiner*—Emmanuel M Marcelo

(57) ABSTRACT

In a reel with a spool a hood and an axially aligned and substantially cup-shaped rotor partially encircling the spool, a molded monocoque frame rotor design in which the monocoque frame is molded to include various features of the rotor and in which the leading and trailing edges of the rotor are of a material substantially different from the monocoque frame.

14 Claims, 4 Drawing Sheets

ROTOR ASSEMBLY FOR FISHING REELS

CROSS-REFERENCE TO RELATED APPLICATIONS

The following references are considered relative prior art.
U.S. Pat. No. 2,299,156, U.S. Pat. No. 4,997,143
U.S. Pat. No. 3,044,730, U.S. Pat. No. 5,167,381
U.S. Pat. No. 3,381,914, U.S. Pat. No. 5,213,279
U.S. Pat. No. 3,858,822, U.S. Pat. No. 5,244,165
U.S. Pat. No. 3,900,167, U.S. Pat. No. 5,393,004
U.S. Pat. No. 4,359,196, U.S. Pat. No. 5,427,325
U.S. Pat. No. 4,376,518, U.S. Pat. No. 5,467,932
U.S. Pat. No. 4,637,569, U.S. Pat. No. 5,740,976
U.S. Pat. No. 4,640,470, U.S. Pat. No. 6,299,086
U.S. Pat. No. 4,756,487, U.S. Pat. No. 6,375,107
U.S. Pat. No. 4,778,120, U.S. Pat. No. 6,612,064
U.S. Pat. No. 4,778,123, U.S. Pat. No. 6,581,318
U.S. Pat. No. 4,768,731

STATEMENT REGARDING FEDERALLY SPONSORED RESEARCH OR DEVELOPMENT

Not applicable

REFERENCE TO SEQUENCE LISTING, TABLE, OR DISK APPENDIX

Not applicable

BACKGROUND OF THE INVENTION

A category of fishing reels known commonly as SPINCASTING REELS or CLOSED-FACE SPINNING REELS has as a common feature a sheet-formed and substantially cup-shaped rotor device.

For improved clarity, the following discussion mentions only spincasting reels, but leaves it understood that the descriptions apply to all reels in the broader category.

The typical rotor of a spincasting reel substantially encircles the reel's spool and by certain related mechanisms serves to either release line from the spool for casting a lure or to rewind the line back onto the spool after a lure has been cast.

From the earliest development of spincasting reels, various parts and mechanisms have been attached to the rotor to improve its performance, but in all cases the rotor has retained its primary release and rewind functions. Common to all spincasting reel rotor designs has been their substantially cup-shaped structure which has always been formed by various known processes from a single sheet of material, most often steel.

The following descriptions refer only to steel rotors, but leave it understood that the description applies to any sheet-formed rotor structure.

The primary advantages of steel rotors are as follows:
1. Steel rotor surfaces and their formed edges are severely rubbed and abraded by fishing line as it is cast or retrieved from spincasting reels. These steel edges and surfaces are of a solid and slippery nature and cannot be easily damaged or abraded by the continuous friction of the fishing line.
2. Steel rotors are strong enough to permit a simple keyedhole attachment to the main shaft of the reel to hold the rotors rotatably fixed thereto.

The primary disadvantages of steel rotors are the following:
1. Steel rotors are heavy. Because the gauge of the steel used to form the rotor must be thick enough to insure proper strength of the rotor, the rotor weight represents a substantial portion of a spincasting reel's total weight.
2. Steel rotors are costly. Sheet-forming steel forces costly manufacturing processes and the weight of the material forces a high material cost.
3. The related mechanisms that attach to and function with the rotor must be designed and manufactured in special ways to attach them to the steel sheet of the rotor.
4. The sheet-formed rotor must be punched or pressedformed or otherwise prepared to receive these related mechanism attachments. This preparation forces increased processing cost and forces undesirable production and assembly difficulties.

PURPOSE OF THE INVENTION

The purpose of this invention is to provide an improved rotor construction for spincasting and closed-face fishing reels.

Another purpose of this invention to provide a rotor of substantially reduced weight when compared to known sheet-formed rotors of similar size.

A further purpose of this invention is to provide a rotor with attachment means integrally formed as a part of the rotor structure.

Another purpose of this invention is to provide a rotor with reduced assembly requirements as compared to common sheet-formed rotors.

It is a further purpose of this invention to provide a rotor of reduced weight and cost with strength and stability equal to or superior to existing sheet-formed rotors.

DETAILED DESCRIPTION OF THE INVENTION

Figure 1:
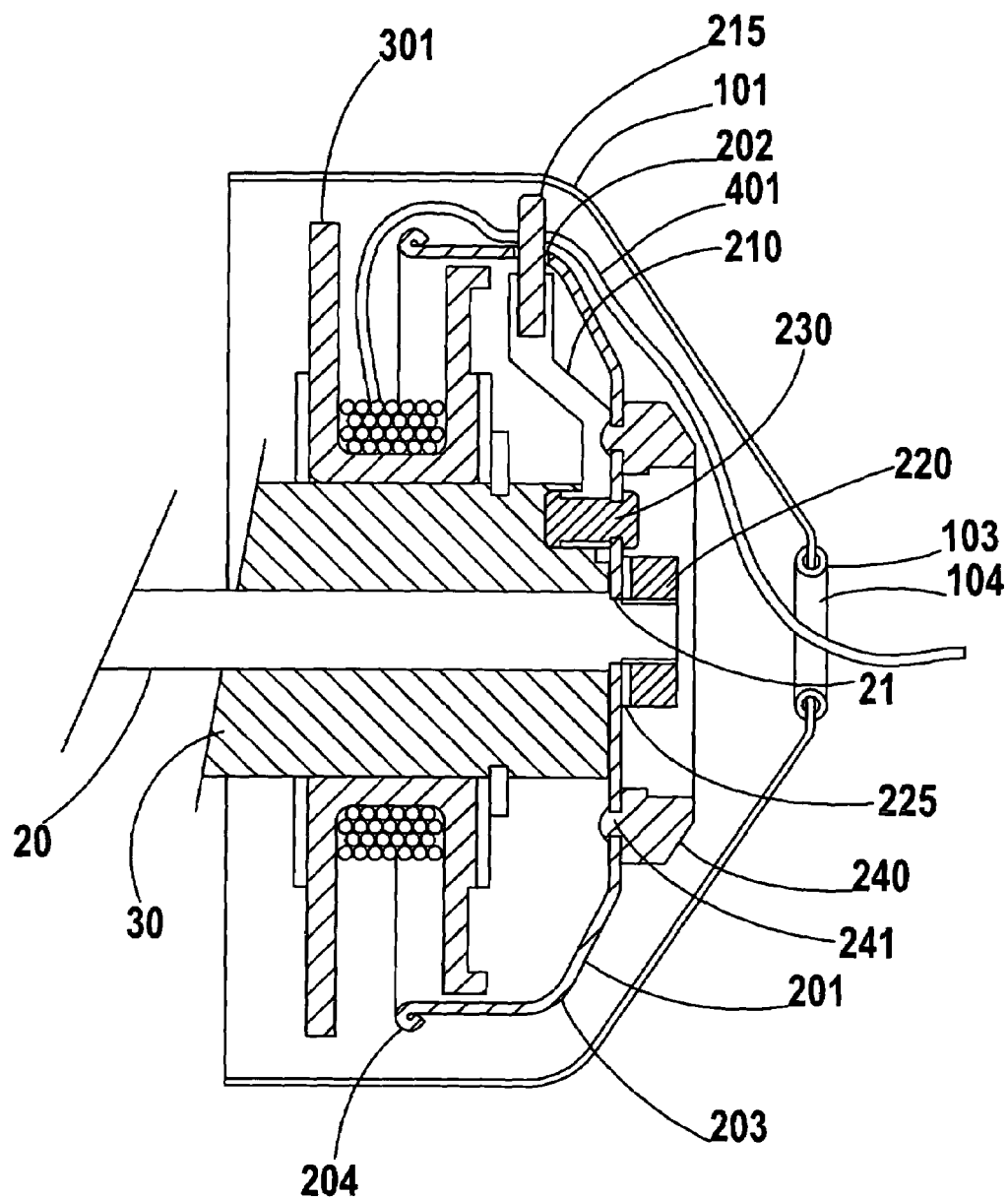
FIG. 1 is a sectioned view of existing spincasting reel art

Certain categories of fishing reels have as a common feature a substantially cup shaped rotor which covers a portion of and is radially aligned with the reel's spool. With related mechanisms, the rotor functions to either release fishing line for casting from the spool of the reel or for retrieving line back onto the spool after casting. It is the purpose of the invention to teach an improved construction of the reel parts as they are used in a conventional manner. The function of the parts may therefore be summarized briefly as follows:

FIG. 1 shows existing reel art in which Steel Rotor 201 is keyed to Main Shaft 20 at 21 and is held fixed thereto by rotor nut 220 through lock washer 225 so that the Steel Rotor and Main Shaft move in unison. Fixed to the Steel Rotor is Carrier Pivot Support 230 and rotatably fixed on 230 is Pin Carrier 210. Pickup pin 215 is fixed to Pin Carrier 210. Rotor Snubber 240 is attached to the Steel Rotor by Snubber Posts 241.

Main Shaft 20 is slideably and rotatably supported by Main Shaft Support 30, and by known means, the Main Shaft and attached Steel Rotor may be turned by gears of the reel which are not shown. By known means not shown the Main Shaft and attached Steel Rotor may be urged toward Hood Grommet 103 to force snubber 240 to pinch line 401 against Hood 101.

As the Pin Carrier is caused to pivot by known methods on the Pivot Support, Pickup Pin 215 pivots alternately in a conventional manner from a position flush with the surface of the rotor to allow the Line to unwind from Spool 301 to a position extended substantially above the rotor surface to ensnare the line and cause it to be rewound back onto the Spool as the rotor is turned by the Gears.

During fishing, as line is alternately cast from and then retrieved back onto the Spool, there is substantial abrasion between the Line and the Steel Rotor at both the Leading Edge 203 and the Trailing Edge 204 so that these edges must be of a smooth and durable nature.

From the above description it can be understood that present reel art requires many parts to be attached to the Rotor to permit conventional functioning of the reel. These attached parts must be manufactured individually and the rotor must be formed in a difficult and exacting manner so as to allow the attachment. The material, tooling and processing costs required to form the Steel Rotor force a high Steel Rotor cost. The tooling and processing required to separately produce the attached parts increase the cost further. The difficulty and time required to assemble the parts to the Steel Rotor add assembly considerations and still further cost.

Figure 2:
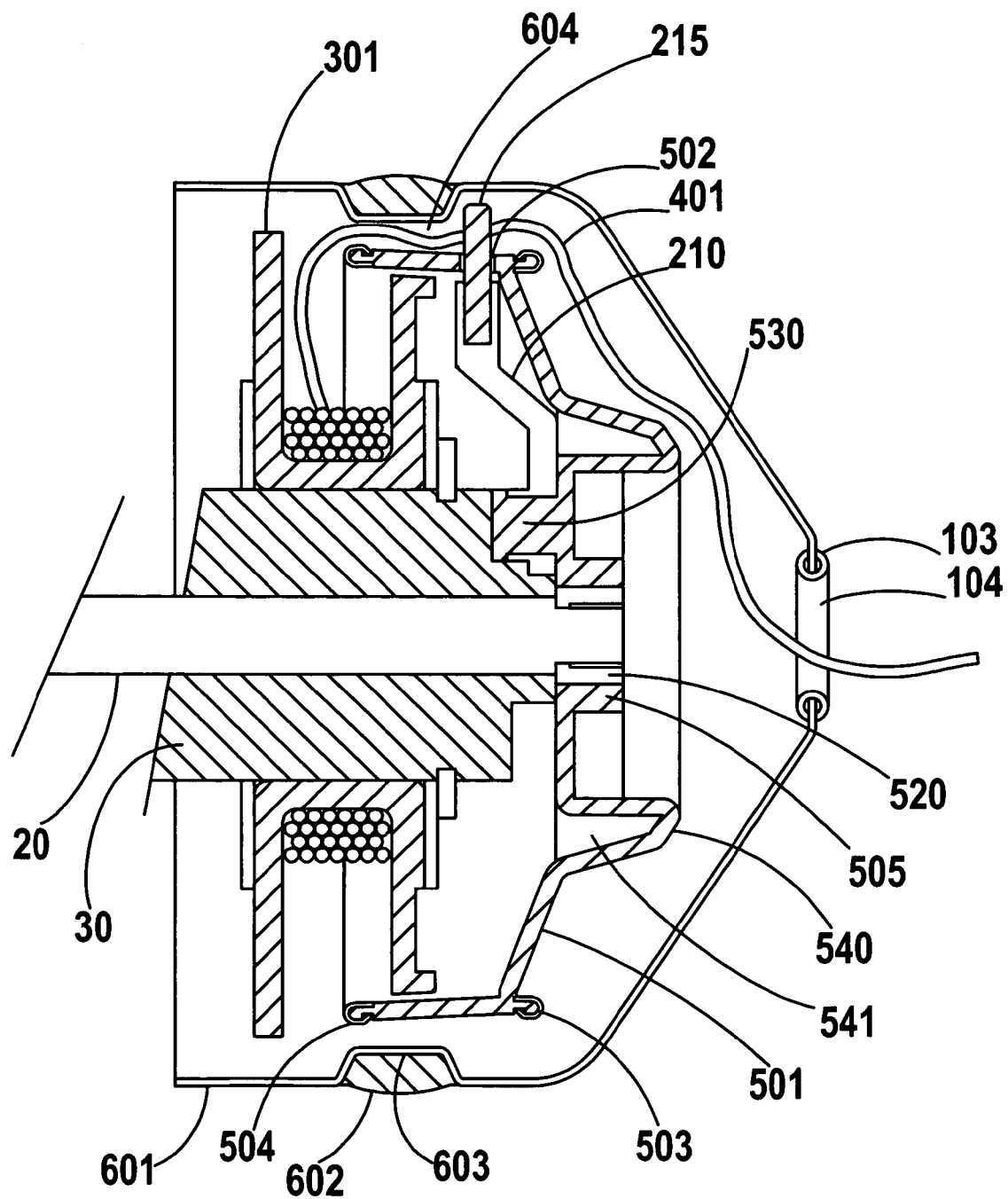
FIG. 2 is a sectioned view of the preferred embodiment of the invention

The rotor of FIG. 2 shows a monocoque rotor design in which the rotor body and other parts of the rotor assembly are made as a single piece in a single manufacturing process such as injection molding or the like. In the reel of FIG. 2 Rotor 501 is shaped as a single piece to include Rotor Snubber 540, Rotor Snubber Ribs 541, Pickup Pin Hole 502, Carrier Pivot Post 530 and Nut Holder 505. Rotor Nut 520 may be molded as an integral part of the Rotor or inserted in the Nut Holder in a simple secondary process. Leading Edge 503 and Trailing Edge 504 are surfaced with a slippery hard material by simple, known methods.

Figure 3:
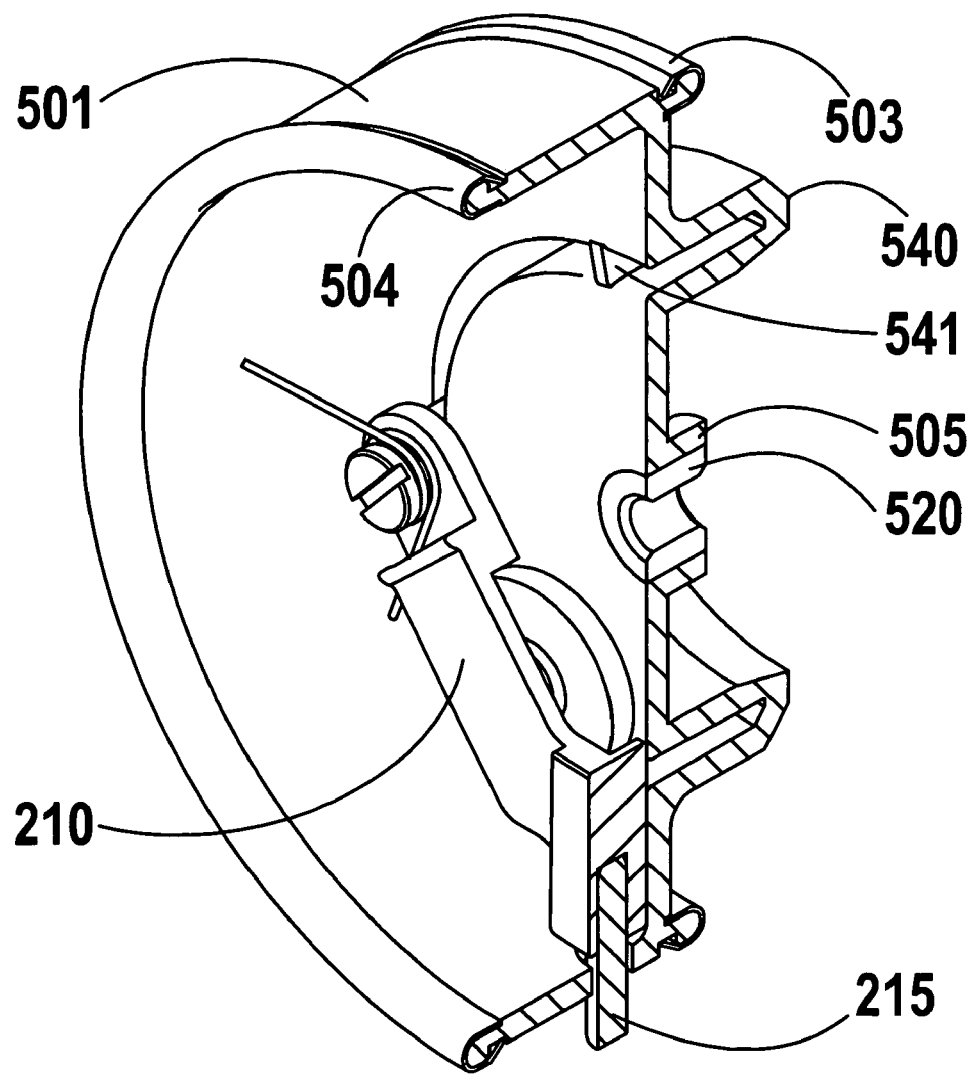
FIG. 3 is an isometric sectioned portion of FIG. 2

FIG. 3 is an isometric sectioned portion of FIG. 2 providing an alternate view of the embodiment.

The improved Rotor construction of FIG. 2 permits a low cost and light weight material such as known polymers to be molded into a one-piece monocoque rotor construction. Since polymers and similar material are relatively soft in nature and cannot withstand line abrasion, the leading and trailing edges of the rotor frame may be surfaced by simple and known methods with a harder more slippery material such as stainless steel or the like.

It is understood that alternate posts or appendages may be molded integral with the monocoque frame rotor to mount, align or otherwise affix alternate parts or features to the rotor assembly.

As a further improvement, the embodiment of FIG. 2, teaches a circumferential indent 603 in the Hood that is filled with a Gripping Ring 602 so that a Restricted Path 604 is formed between the Hood and the monocoque Rotor. This Restricted Path forces a more positive engagement of the Line with the Pickup Pin when the Pickup Pin is extended in a conventional manner to cause Line to rewind onto the spool.

It is understood that the Leading Edge and Trailing Edge of the rotor may be shaped of materials such as metal, ceramic or the like which are formed separately and then attached to the monocoque rotor. Such an alternate construction is shown in FIG. 3 in which Formed Leading Edge 651 and Formed Trailing Edge 652 are separately manufactured rings of a desired material which are attached to the monocoque rotor.

Figure 4:
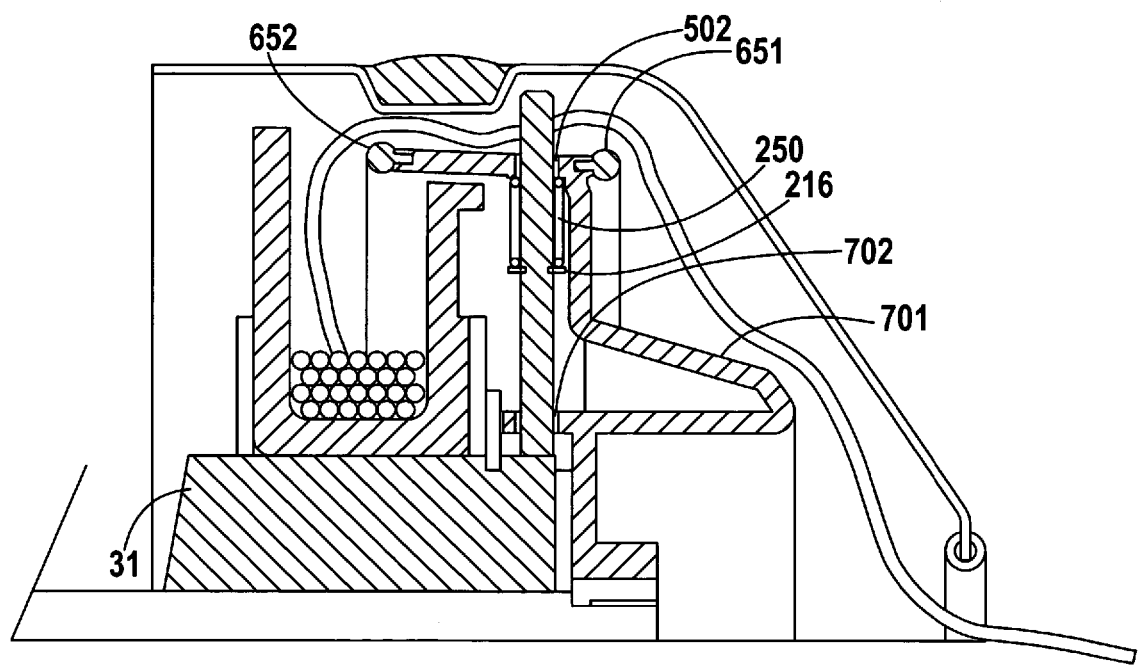
FIG. 4 is a sectioned view of another embodiment of the invention

FIG. 4 shows a sliding pickup pin system in which the sliding pickup pin is held slideably in the monocoque rotor frame. The function of sliding pickup pins is known, but in conventional steel rotors, the attachment means to hold the pickup pin to the rotor require secondary processes and careful assembly and alignment for proper pin attachment. The pickup pin of FIG. 3 is held slideably in Pickup Pin holes 502 and 702. Both Pickup Pin holes 502 and 702 are formed as integral features of the molded monocoque rotor frame. Pickup Pin Spring 250 is compressed between the rotor frame and Circlip 216 to bias the Pickup Pin toward the Main Frame Support as is conventional.

The invention claimed is:

1. In a fishing reel with a spool, a hood and an axially aligned and substantially cup-shaped rotor encircling the spool, said rotor carrying at least one retractable pickup pin for engaging line and comprising a monocoque frame rotor design in which the monocoque frame is molded to integrally include a snubbing ring, a circumferential leading edge and a circumferential trailing edge with either one or both the leading edge or trailing edges of a material different from the rotor monocoque frame.

2. The rotor of claim 1 in which the monocoque frame includes an integral pivoting pickup pin attachment means.

3. The rotor of claim 1 in which the monocoque frame includes an integral sliding pickup pin attachment means.

4. The rotor of claim 1 in which the monocoque frame includes an integral rotor nut.

5. The rotor of claim 1 in which the monocoque frame includes an integral rotor nut attachment means.

6. The reel of claim 1 with a circumferential hood detent to force a restricted path between the hood and monocoque rotor frame to force line into positive engagement with the pickup pin during retrieve.

7. In a spincasting reel with a spool, a hood and an axially aligned and substantially cup-shaped rotor encircling the spool, said rotor carrying at least one retractable pickup pin for engaging line and comprising a monocoque frame rotor design including a circumferential leading edge and a circumferential trailing edge in which one or both the leading edge or trailing edge of the rotor is material of a different nature than that of the monocoque frame.

8. The rotor of claim 7 in which the monocoque frame includes an integral pivoting pickup pin attachment means.

9. The rotor of claim 7 in which the monocoque frame includes an integral sliding pickup pin attachment means.

10. The rotor of claim 7 in which the monocoque frame includes an integral rotor nut.

11. The rotor of claim 7 in which the monocoque frame includes an integral rotor nut attachment means.

12. The reel of claim 7 with a circumferential hood detent to force a restricted path between the hood and monocoque rotor frame to force line into positive engagement with the pickup pin during retrieve.

13. In a spincasting reel with a spool and hood and an axially aligned and substantially cup-shaped rotor encircling the spool, a monocoque frame rotor design including a circumferential leading edge and a circumferential trailing edge and carrying at least one retractable pickup pin for engaging line said rotor having one or more integrally formed shapes for attaching or aligning parts thereto and with at least one of the rotor leading edge or trailing edge comprised of material substantially different from the rotor frame.

14. The reel of claim 13 with a circumferential hood detent to force a restricted path between the hood and monocoque rotor frame to force line into positive engagement with the pickup pin during line retrieval.

* * * * *